Jan. 18, 1949.                D. B. HAMPTON                2,459,160
                                   TRAP
                             Filed March 11, 1946
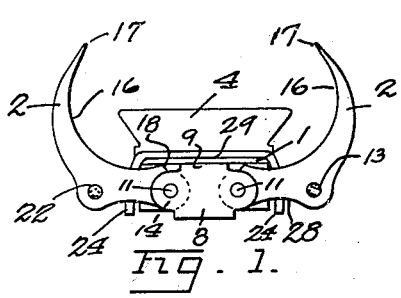
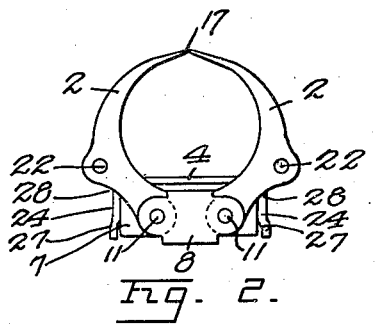
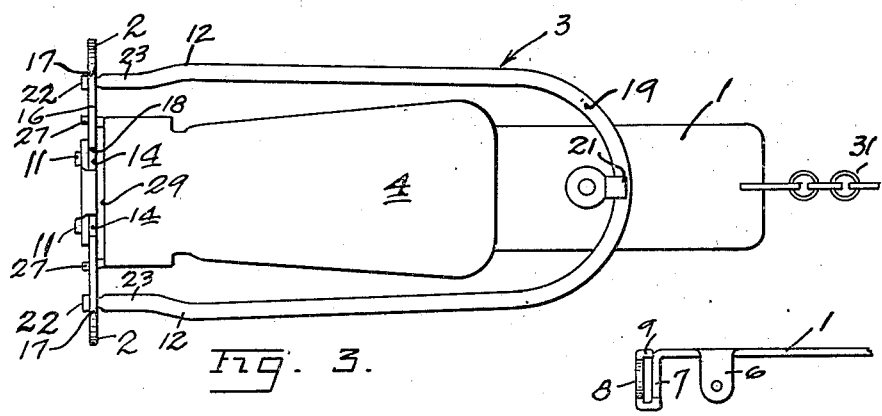
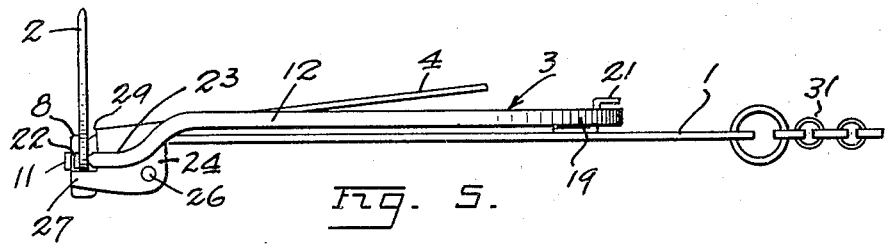
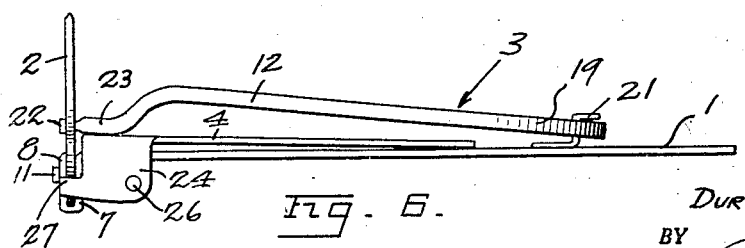
INVENTOR.
DURWARD B. HAMPTON
BY George B. White
HIS ATTORNEY Patented Jan. 18, 1949

2,459,160

UNITED STATES PATENT OFFICE 2,459,160

TRAP

Durward B. Hampton, Sebastopol, Calif.

Application March 11, 1946, Serial No. 653,617

15 Claims. (Cl. 43—91)

This invention relates to a trap and particularly to a gopher trap.

One of the objects of the invention is to provide a gopher trap where the path of approach to the treadle of the trap is unobstructed by any piece of the trap so that the animal can pass between the jaws of the trap without passing over any part of the device.

Another object of the invention is to provide a trap of the character described which can be set easily without handling the jaws or the treadle of the trap, and particularly by simply depressing a resilient element to hold the jaws substantially at dead center, with respect to their fulcrums and wherein the jaws of the trap are quickly sprung upon very slight movement from said dead center when the treadle is depressed by the animal.

Another object of the invention is to provide a trap of the character described which can be easily placed into gopher holes and operates positively and efficiently.

The essential features of the invention involved in the carrying out of the objects indicated are susceptible to modification, but a preferred embodiment of the invention is shown in the accompanying drawings, in which:

Fig. 1 is an end view of the trap with the jaws set open;

Fig. 2 is the end view of the trap with the jaws sprung or closed;

Fig. 3 is a top plan view of the trap with the jaws open;

Fig. 4 is a detail fragmental view of the bearing end of the base of the trap;

Fig. 5 is a side view of the trap in set position, and

Fig. 6 is a side view of the trap in sprung position.

My trap in general includes a base 1 which is in the form of a plate with suitable bearing structure at one end thereof. Jaws 2 are mounted on the bearing end of the base 1 so as to be movable in a substantially vertical plane. A bow spring 3 anchored on the base 1 has its ends connected to the respective jaws 2 so as to urge the jaws 2 together. A treadle 4 is pivoted at the bearing end of the base 1 and extends over said base 1 from the jaws 2 toward the middle of the bow spring 3.

The base 1 is preferably made of a flat plate, near the bearing end of which are a pair of downwardly extended ears 6 which form the bearing for the treadle 4. The extreme end of the base 1 is turned downwardly to form an end bracket 7 and then it turns upon itself to form an outer bearing wall 8 and a tongue 9 at the top at about the level of the top surface of the base 1.

The jaws 2 are fulcrumed between the bracket 7 and the bearing wall 8 on spaced pivots 11. The pivots 11 are below the general level of the base 1 and are on axes substantially parallel with the longitudinal axis of the base 1. Each jaw 2 is formed for the application of forces in a manner to hold the jaws in open position by spring pressure directed towards said pivots 11 at about dead center, and to spring the jaws to closed position when this balanced position is disturbed. The spring 3 is substantially U shaped and each free end 12 thereof is extended into a hole 13 of one of the jaws 2. The holes 13 are substantially on dead center or on a straight line alignment with the pivots 11 when the jaws 2 are open.

The pivoted end 14 of each jaw 2 is rounded and fits between the bearing bracket 7 and bearing wall 8. Each rounded end 14 has a hole therethrough so as to rotate upon the pivots 11. Each jaw 2 is substantially semi-circular on its inner edge 16 so as to provide an open space and minimize any obstruction in the gopher hole or the like. Each jaw 2 terminates at its free end in a sharp point 17 so as to firmly grip the trapped animal. Each jaw also has an abutment shoulder 18 formed at its pivoted end 14 for abutting the opposite ends of the tongue 9 above the pivots 11 to thereby determine the limit of the inward swing of the prongs or jaws 2. The relation of the shoulder 18 and the curvature of each jaw 2 is such as to permit the movement of the jaws to bring the points 17 close together but to prevent the points 17 from touching or impacting one another.

As the free ends 12 of the bow spring 3 are depressed the jaws 2 are swung outwardly around the respective pivots 11 and thereby spread the ends 12 of the bow spring 3 farther apart and increase the tension of said bow spring. The tendency of the bow spring 3 to resume its original shape causes a tension or pull toward the respective pivots 11 which force holds the portion of each jaw 2 between the holes 13 and the pivots 11 in compression. When the holes 13 are at dead center with respect to the pivots 11 this inwardly pressing force of the free ends 12 of the bow spring 3 functions to hold the jaws 2 in the spread or open position.

The U-shaped bow spring 2 has its turn or base 19 anchored on the top of the base 1 in a suitable manner. For instance in the herein illustrated embodiment the turn or middle portion 19 of the bow spring 3 is under a hook 21 which latter is extended from the top of the base 1. The free ends 12 of the bow spring 3 are bent or enlarged to form a head 22 to prevent the sliding of the bow spring 3 out of the jaws 2. It is to be noted, however, that during the swinging of the jaws 2 the portions of the bow spring 3 in the holes 13 of the jaws 2 are permitted a limited forward and backward play to compensate for the arcuate outward swinging of the legs of the spring 3. The aforementioned heads 22 on the free ends 12 of the spring 3 prevent disengagement of the spring from said jaws 2, and the play is not large enough to dislodge the spring 3 from the hook 21 on the base 1.

The portions adjacent the free ends 12 of each leg of the spring 3 are bent or indented for forming thumb rests 23. When setting the trap the fingers of the hands may be pressed against the underside of the base 1 and the thumbs of the hands in the thumb rests 23 on the bow spring 3 at the jaws 2, or at the bend or corner of said rests 23, providing a leverage for the easy setting of the trap.

The treadle 4 lies generally parallel and superimposed upon the top face of the base 1. At the pivoted end of the treadle 4 a pair of ears 24 are extended downwardly over the ears 6 of the base 1. Pivots 26 journal the treadle ears 24 upon the bearing ears 6 of the base 1. The treadle pivots 26 are transverse or substantially at right angles to the longitudinal axis of the base 1. From each treadle ear 24 extends an abutment 27 under the outer edge of each jaw 2 at a concave curved portion 28 about midway between the hole 13 and the pivot 11, which portion is suitably curved for engagement with the abutment 27 when the jaws 2 are swung into a position where the holes 13 are at dead center with the pivots 11. It is to be noted that the treadle pivots 26 are slightly higher or closer to the base 1 than the abutments 27 so as to allow limited play to the abutments 27. This relationship results in a slight downward moving of the abutments 27 and the corresponding slight raising of the treadle 4 about the base 1. This turning or setting movement of the treadle 4 is determined and limited by the transverse edge 29 of the treadle 4 adjacent and above the bearing end of the base 1. Upon the slight turning movement necessary to allow setting of the treadle, the edge 29 of the treadle bears against the top of the bearing bracket 7 on the base 1 and holds the trap in adjusted position.

The base 1 may be provided with the usual chain 31 or the like for the purpose of inserting it into and removing the trap from a gopher hole or the like.

In operation the user presses down at the thumb rests 23 until the abutment edges or curved portions 28 engage the treadle abutments 27 and set the treadle 4. In this adjustment the free ends 12 of the spring 3 are under tension because they were moved apart during the downward swinging of the jaw 2. The tension of the bow spring 3 exerts forces toward the jaw pivots 11 at a dead center in this position and holds the trap set. The trap is then inserted into a gopher hole or the like so that the jaws 2 face in the direction from which the approach of the animal is expected. As the animal passes between the jaws 2 and over the treadle 4, it presses the treadle down sufficiently for the treadle abutments 27 to trip the jaws 2 upwardly out of the dead center position, whereupon the action of the free ends 12 of the bow spring 3 snaps the jaws 2 together and traps the animal.

The various limits and control of movement of the trap are accomplished at the bent or bearing end of a unitary frame formed by the base 1. The entire power of the bow spring 3 is applied at the bearing end of the frame. The trap is easy to set without danger of injury to the operator, it eliminates any mechanism in the path of approach to the jaws and to the treadle of the trap, it positively operates for setting and springing the trap, and is eminently adapted for the purposes heretofore set forth.

I claim:

1. A trap of the character described comprising a base, a pair of jaws pivoted at one end of said base and swingable outwardly from the sides of the base to leave an unobstructed passage therebetween over said base, resilient means to swing said jaws together into trapping position, means of connection between said resilient means and said jaws exerting a force upon said jaws at dead center with respect to the pivots of said jaws when said jaws are swung apart, and tripping means on said base for tripping said jaws and said resilient means out of said dead center position.

2. A trap of the character described comprising a base, a pair of jaws pivoted at one end of said base and swingable outwardly from the sides of the base to leave an unobstructed passage therebetween over said base, resilient means to swing said jaws together into trapping position, means of connection between said resilient means and said jaws exerting a force upon said jaws at dead center with respect to the pivots of said jaws when said jaws are swung apart, tripping means on said base for tripping said jaws and said resilient means out of said dead center position, and means to limit the outward swing of said jaws to said dead center position.

3. A trap of the character described comprising a base, a pair of jaws pivoted at one end of said base and swingable outwardly from the sides of the base to leave an unobstructed passage therebetween over said base, resilient means to swing said jaws together into trapping position, means of connecting between said resilient means and said jaws exerting a force upon said jaws at dead center with respect to the pivots of said jaws when said jaws are swung apart, tripping means on said base for tripping said jaws and said resilient means out of said dead center position, means to limit the outward swing of said jaws to said dead center position, and means to limit the inward swinging of said jaws.

4. A trap of the character described comprising a base, a pair of jaws pivoted at one end of said base and swingable outwardly from the sides of the base to leave an unobstructed passage therebetween over said base, resilient means to swing said jaws together into trapping position, means of connection between said resilient means and said jaws exerting a force upon said jaws at dead center with respect to the pivots of said jaws when said jaws are swung apart, tripping means on said base for tripping said jaws and said resilient means out of said dead center position, and means associated with said tripping means to limit the outward swinging of said jaws to said dead center position.

5. In a trap of the character described, a base, a bearing member formed at an end of the base, a pair of jaws fulcrumed in said bearing member to swing in a plane transverse to the base, said jaws being curved to leave an unobstructed path therebetween to said base, resilient means to urge said jaws toward each other, a connection between said resilient means and said jaws exerting force upon said jaws toward said base at dead center when said jaws are swung into open position, and tripping means on said base to trip said jaws and said resilient means out of said dead center position and toward sprung position when engaged by an animal passing between said jaws.

6. In a trap of the character described, a base, a bearing member formed at an end of the base, a pair of jaws fulcrumed in said bearing member to swing in a plane transverse to the base, said jaws being curved to leave an unobstructed path therebetween to said base, a substantially U-shaped spring anchored on said base and engaging said jaws for urging said jaws together into sprung position, the points of engagement of said spring with said jaws being at dead center with the fulcrums of said jaws when the jaws are open to hold said jaws in said open position, and tripping means engageable by the animal passing between said jaws to shift said jaws out of said dead center position and toward sprung position, said spring swinging said jaws into said sprung position when tripped.

7. In a trap of the character described, a base, a bearing member formed at an end of the base, a pair of jaws fulcrumed in said bearing member to swing in a plane transverse to the base, said jaws being curved to leave an unobstructed path therebetween to said base, a substantially U-shaped spring anchored on said base and engaging said jaws for urging said jaws together into sprung position, the points of engagement of said spring with said jaws being at dead center with the fulcrums of said jaws when the jaws are open to hold said jaws in said open position, and tripping means engageable by the animal passing between said jaws to shift said jaws out of said dead center position and toward sprung position, said spring swinging said jaws into said sprung position when tripped, the parts of said U shaped spring adjacent said jaws being formed into rests for manipulation for the setting of said jaws.

8. In a trap of the character described, a base, a bearing member formed at an end of the base, a pair of jaws fulcrumed in said bearing member to swing in a plane transverse to the base, said jaws being curved to leave an unobstructed path therebetween to said base, a substantially U-shaped spring anchored on said base and engaging said jaws for urging said jaws together into sprung position, the points of engagement of said spring with said jaws being at dead center with the fulcrums of said jaws when the jaws are open to hold said jaws in said open position, and tripping means engageable by the animal passing between said jaws to shift said jaws out of said dead center position and toward a spring position, said spring swinging said jaws into said sprung position when tripped, said tripping means including a treadle upon the base, the pivot bearings of said treadle extending below the level of said base adjacent said jaws, and extensions on the pivoted end of said treadle extending below said jaws to limit the swinging of said jaws to said dead center position and to raise said treadle into set position, said extension tripping said jaws when said treadle is depressed by an animal passing over said treadle.

9. In a trap of the character described, a base, a bearing member formed at an end of the base, a pair of jaws fulcrumed in said bearing member to swing in a plane transverse to the base, said jaws being curved to leave an unobstructed path therebetween to said base, a substantially U-shaped spring anchored on said base and engaging said jaws for urging said jaws together into sprung position, the points of engagement of said spring with said jaws being at dead center with the fulcrums of said jaws when the jaws are open to hold said jaws in said open position, and tripping means engageable by the animal passing between said jaws to shift said jaws out of said dead center position and toward sprung position, said spring swinging said jaws into said sprung position when tripped, said tripping means including a treadle upon the base, the pivot bearings of said treadle extending below the level of said base adjacent said jaws, and extensions on the pivoted end of said treadle extending below said jaws to limit the swinging of said jaws to said dead center postion and to raise said treadle into set position, said extensions tripping said jaws when said treadle is depressed by an animal passing over said treadle, and means at the bearing end of said base to limit the swinging of said jaws towards each other.

10. In a trap of the character described, a base, a bearing socket member formed transversely on one end of said base, a pair of jaws fulcrumed in said bearing socket member on axes substantially parallel with the sides of said base, said jaws being adapted to leave an unobstructed passage to said base when the jaws are open, a substantially U-shaped spring anchored at its middle on the base, legs on said spring connected to said jaws to normally urge said jaws together and to open said jaws around their fulcrums when said legs are depressed with respect to said base, a treadle on said base between said spring and said jaws and being pivoted on said base, and abutments extended from the pivoted end of said treadle and engageable by said jaws in the open position to shift said treadle away from the base to an inclined position, said pivoted end of said treadle engaging said base to limit the raising of said treadle and the opening of said jaws to a position where the connection of the legs of said spring with said jaws is acting at dead center with respect to the fulcrum of said jaws.

11. In a trap of the character described, a base, a bearing socket member formed transversely on one end of said base, a pair of jaws fulcrumed in said bearing socket member on axes substantially parallel with the sides of said base, said jaws being adapted to leave an unobstructed passage to said base when the jaws are open, a substantially U-shaped spring anchored at its middle on the base, legs on said spring connected to said jaws to normally urge said jaws together and to open said jaws around their fulcrums when said legs are depressed with respect to said base, a treadle on said base between said spring and said jaws and being pivoted on said base, and abutments extended from the pivoted end of said treadle and engageable by said jaws in the open position to shift said treadle away from the base to an inclined position, said pivoted end of said treadle engaging said base to limit the raising of said treadle and the opening of said jaws to a position where the connection of the legs of said spring with said jaws is acting at dead center with respect to the fulcrums of said jaws, and abutment shoulders on said jaws engaging said transverse bearing member in the sprung position of said jaws before the points of said jaws contact one another.

12. In a trap of the character described, a base, a bearing socket member formed transversely on one end of said base, a pair of jaws fulcrumed in said bearing socket member on axes substantially parallel with the sides of said base, said jaws being adapted to leave an unobstructed passage to said base when the jaws are open, a substantially U-shaped spring anchored at its middle on the base, legs on said spring connected to said jaws to normally urge said jaws together and to open said jaws around their fulcrums when said legs are depressed with respect to said base, a treadle on said base between said spring and said jaws and being pivoted on said base, and abutments extended from the pivoted end of said treadle and engageable by said jaws in the open position to shift said treadle away from the base to an inclined position, said pivoted end of said treadle engaging said base to limit the raising of said treadle and the opening of said jaws to a position where the connection of the legs of said spring with said jaws is acting at dead center with repsect to the fulcrums of said jaws, the legs of said spring adjacent said jaws being bent to form rests for manipulating said spring to jaw opening position.

13. In a trap of the character described, a base, a bearing socket member formed transversely on one end of said base, a pair of jaws fulcrumed in said bearing socket member on axes substantially parallel with the sides of said base, said jaws being adapted to leave an unobstructed passage to said base when the jaws are open, a substantially U-shaped spring anchored at its middle on the base, legs on said spring connected to said jaws to normally urge said jaws together and to open said jaws around their fulcrums when said legs are depressed with respect to said base, a treadle on said base between said spring and said jaws and being pivoted on said base, and abutments extended from the pivoted end of said treadle and engageable by said jaws in the open position to shift said treadle away from the base to an inclined position, said pivoted end of said treadle engaging said base to limit the raising of said treadle and the opening of said jaws to a position where the connection of the legs of said spring with said jaws is acting at dead center with respect to the fulcrums of said jaws, the pivot of said treadle being below the level of said base.

14. In a trap of the character described, a base, a bearing socket member formed transversely on one end of said base, a pair of jaws fulcrumed in said bearing socket member on axes substantially parallel with the sides of said base, said jaws being adapted to leave an unobstructed passage to said base when the jaws are open, a substantially U-shaped spring anchored at its middle on the base, legs on said spring connected to said jaws to normally urge said jaws together and to open said jaws around their fulcrums when said legs are depressed with respect to said base, a treadle on said base between said spring and said jaws and being pivoted on said base, and abutments extended from the pivoted end of said treadle and engageable by said jaws in the open position to shift said treadle away from the base to an inclined position, said pivoted end of said treadle engaging said base to limit the raising of said treadle and the opening of said jaws to a position where the connection of the legs of said spring with said jaws is acting at dead center with respect to the fulcrums of said jaws, said jaws being substantially arcuate and having holes for said connections of the legs of said spring and for said fulcrums substantially at dead center when said jaws are in open position.

15. In a trap of the character described, a base, a bearing socket member formed transversely on one end of said base, a pair of jaws fulcrumed in said bearing socket member on axes substantially parallel with the sides of said base, said jaws being adapted to leave an unobstructed passage to said base when the jaws are open, a substantially U-shaped spring anchored at its middle on the base, legs on said spring connected to said jaws to normally urge said jaws together and to open said jaws around their fulcrums when said legs are depressed with respect to said base, a treadle on said base between said spring and said jaws and being pivoted on said base, and abutments extended from the pivoted end of said treadle and engageable by said jaws in the open position to shift said treadle away from the base to an inclined position, said pivoted end of said treadle engaging said base to limit the raising of said treadle and the opening of said jaws to a position where the connection of the legs of said spring with said jaws is acting at dead center with respect to the fulcrum of said jaws, said treadle in the set position being inclined upwardly and away from said jaws.

DURWARD B. HAMPTON.

REFERENCES CITED

The following references are of record in the file of this patent:

UNITED STATES PATENTS

| Number | Name | Date |
|---|---|---|
| 488,232 | Ward | Dec. 20, 1892 |
| 689,743 | Norlund | Dec. 24, 1901 |
| 1,479,853 | Gambee | Jan. 8, 1924 |